US010205923B2

United States Patent
Xiao et al.

(10) Patent No.: US 10,205,923 B2
(45) Date of Patent: Feb. 12, 2019

(54) APPARATUS AND METHOD FOR PROCESSING A PROJECTED IMAGE, AND PROJECTION DISPLAY SYSTEM

(71) Applicant: Hisense Co., Ltd., Qingdao (CN)

(72) Inventors: Jichen Xiao, Qingdao (CN); Dabo Guo, Qingdao (CN)

(73) Assignees: Hisense Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/459,755

(22) Filed: Mar. 15, 2017

(65) Prior Publication Data

US 2017/0187998 A1 Jun. 29, 2017

(30) Foreign Application Priority Data

Nov. 18, 2016 (CN) .......................... 2016 1 1026065

(51) Int. Cl.
*H04N 9/31* (2006.01)
(52) U.S. Cl.
CPC ......... *H04N 9/3188* (2013.01); *H04N 9/3141* (2013.01)
(58) Field of Classification Search
CPC .................................................. H04N 9/3188
USPC ....................................................... 348/745
See application file for complete search history.

(56) References Cited

U.S. PATENT DOCUMENTS

| 5,633,655 A * | 5/1997 | Hara ....................... G06F 3/147 345/698 |
| 2006/0029252 A1* | 2/2006 | So .......................... G06T 1/0085 382/100 |
| 2006/0181683 A1* | 8/2006 | Bhowmik .............. G03B 37/04 353/30 |
| 2008/0002161 A1* | 1/2008 | Streid .................... G03B 21/32 353/98 |
| 2008/0068402 A1* | 3/2008 | Ioka ....................... G09G 3/2088 345/660 |
| 2014/0192171 A1 | 7/2014 | Shin et al. |

(Continued)

FOREIGN PATENT DOCUMENTS

| CN | 1671198 | 9/2005 |
| CN | 105120187 | 12/2015 |
| CN | 105376483 | 3/2016 |

*Primary Examiner* — Michael Lee
(74) *Attorney, Agent, or Firm* — Harness, Dickey & Pierce, P.L.C.

(57) ABSTRACT

This disclosure relates to an apparatus and method for processing a projected image, and a projection display system, the apparatus including: at least one processor; and a memory communicatively connected with the at least one processor, wherein: the memory stores instructions executable by the at least one processor, wherein the instructions are executed by the at least one processor to cause the at least one processor: to obtain an image to be projected, and resolution of the image to be projected; to segment the image to be projected, into N frames of images, resolution of each of which is no higher than resolution of an optical valve, wherein N is a positive integer more than 1; and to display the N frames of images in a time-division mode, wherein imaging positions of the N frames of images are offset from each other.

16 Claims, 7 Drawing Sheets

(56) References Cited

U.S. PATENT DOCUMENTS

2015/0016748 A1* 1/2015 Ko ............................ G06T 1/20
382/299

* cited by examiner

APPARATUS AND METHOD FOR PROCESSING A PROJECTED IMAGE, AND PROJECTION DISPLAY SYSTEM

CROSS-REFERENCE TO RELATED APPLICATION

This application claims the benefit and priority of Chinese Patent Application No. 201611026065.9, filed Nov. 18, 2016. The entire disclosure of the above application is incorporated herein by reference.

FIELD

The present disclosure relates to the field of projections, and particularly to an apparatus and method for processing a projected image, and a projection display system.

BACKGROUND

This section provides background information related to the present disclosure which is not necessarily prior art.

The resolution of an image represents the amount of information stored in the image typically as the product of the number of pixels of the image in the row direction, and the number of pixels thereof in the column direction, i.e., the total number of pixels. Given the higher resolution of the image, there will be more pixels in the image, and also the image will be clearer. For example, if there is an image with the resolution of 1920*1080, then the image will include 2M pixels of information, and if there is an image with the resolution of 3840*2160, then the image will include 8M pixels of information.

In a projection display device, the resolution of the projection display device as whole is greatly determined by the resolution of an optical valve which is a light modulation element in an optical device, and the resolution of the optical valve is primarily determined by a Digital Micro-mirror Device (DMD) therein, so the resolution of the DMD in the optical valve becomes an important index to evaluate the performance of the optical valve, where if the resolution of the optical valve is higher, then an image to be projected onto and displayed on a screen will be more detailed, more information will be displayed, and the projected and displayed picture will be finer. However an improvement to the resolution of the optical valve which is a hardware device is restricted by the process of fabricating the hardware device, so the resolution of the optical valve is generally improved more slowly than the resolution of the image. By way of an example in which the DMD is applied to a Digital Light Processing (DLP) projector, the resolution of the DLP projector is generally determined by the resolution of the DMD, where typically the DLP projector includes a DMD chip, and the resolutions of the existing DMD generally include 800*600, 1024*768, 1280*720, and 1920*1080, all of which are lower than the resolution of an existing high-resolution image, e.g., a common image with the resolution of 3840*2160. Consequently the high-resolution image has to be projected and displayed in the related technologies while losing some pixel information, thus resulting in a loss of the quality of the projected image.

SUMMARY

This section provides a general summary of the disclosure, and is not a comprehensive disclosure of its full scope or all of its features.

Embodiments of this disclosure provide an apparatus for processing a projected image, the apparatus including:
at least one processor; and
a memory communicatively connected with the at least one processor, wherein:
the memory stores instructions executable by the at least one processor, wherein the instructions are executed by the at least one processor to cause the at least one processor:
to obtain an image to be projected, and resolution of the image to be projected;
to segment the image to be projected, into N frames of image, the resolution of each of which is no higher than the resolution of an optical valve, wherein N is a positive integer more than 1; and
to display the N frames of images in a time-division mode, wherein imaging positions of the N frames of images are offset from each other.

Embodiments of this disclosure provide a projection display system including a light source, an optical valve, an apparatus for processing a projected image, a beam angle varying device, and a lens, wherein:
wherein the beam angle varying device is arranged between the optical valve and the lens, and configured to adjust imaging positions of N frames of images;
the light source is configured to illuminate the optical valve, so that the optical valve projects the image frames, which are output by the beam angle varying device to the lens for imaging, and projected onto a projection medium, thus resulting in the projected image; and
the apparatus for processing a projected image includes:
at least one processor; and
a memory communicatively connected with the at least one processor, wherein:
the memory stores instructions executable by the at least one processor, wherein the instructions are executed by the at least one processor to cause the at least one processor:
to obtain an image to be projected, and resolution of the image to be projected;
to segment the image to be projected, into N frames of image, resolution of each of which is no higher than resolution of the optical valve, wherein N is a positive integer more than 1; and
to display the N frames of images in a time-division mode, wherein imaging positions of the N frames of images are offset from each other.

Embodiments of this disclosure provide a method for processing a projected image, the method including:
obtaining an image to be projected, and resolution of the image to be projected;
segmenting the image to be projected, into N frames of images, resolution of each of which is no higher than resolution of an optical valve, wherein N is a positive integer more than 1; and
displaying the N frames of images in a time-division mode, wherein imaging positions of the N frames of images are offset from each other.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

As for the optical valve, the DLP projector, for example, generally projects an image signal after processing it digitally. In the DLP projector, there is a light source including a color wheel with three primary colors, and the color wheel in the laser light source typically corresponds to two color wheels including a fluorescent wheel and a color filter wheel, where a light beam is output in a sequence of the three primary colors R, G, and B, and then irradiated onto the DMD chip of the optical valve, the consecutive light is converted into grayscales using a synchronization signal, the grayscales are rendered together with the three colors R, G, and B, and the image is projected through a lens, where essentially the visible digital information is displayed as a result using the DMD chip of the optical valve, and the resolution of the DLP projector is primarily determined by the resolution of the DMD.

Here the DMD is such a bi-stable spatial light modulator including a plurality of micro-mirrors (sophisticated micro reflection mirrors) that is formed by adding a rotating mechanism, capable of adjusting a reflection surface, in a standard semiconductor process of a Complementary Metal Oxide Semiconductor (CMOS). Data are loaded into storage elements located below the micro-mirrors, and offset states of the micro-mirrors are electro-statically controlled by the data in a binary mode, so that the angle at which and the length of time for which each micro-mirror is offset are controlled independently of the other micro-mirrors to thereby guide reflected light and modulate the grayscales, and the image in an area unit is reflected by a single micro-mirror in the DMD into a pixel in the projected image, so the pixels are integrated into the resulting image. The number of micro-mirrors represents the resolution of the DMD, and the light beam can be reflected by the DMD into the image with the same resolution as the DMD, thus resulting in the definition of the image which can be projected and displayed.

For example, if there is a DMD with the resolution of 1024*768, then there will be 1024*768 micro-mirrors on the DMD. There are two stable micro-mirror states $+X°/-X°$ (On/Off) of each micro-mirror. As for the existing device, the micro-mirror is deflected at $±12°$, where if the micro-mirror is deflected at $+12°$, then the reflected light ray will enter the lens, and if the micro-mirror is deflected at $-12°$, then the reflected light ray will not enter the lens. Each micro-mirror is capable of controlling separately the light ray to be transmitted and blocked, and the amount of light entering the lens is determined by the angle at which and the length of time for which each micro-mirror is deflected. For example, the angle at which the light ray is reflected by the micro-mirror is controlled by a video signal modulated by the DLP, where the video signal is modulated by the DLP into an amplitude-constant pulse-width modulated signal, and a period of time for which a light path is switched on and off by the small reflection mirror is controlled by the pulse width, so that the light ray enters the lens, thus resulting in the image in the grayscales at the varying brightness on the screen, such that the image is displayed in real time.

Figure 1:
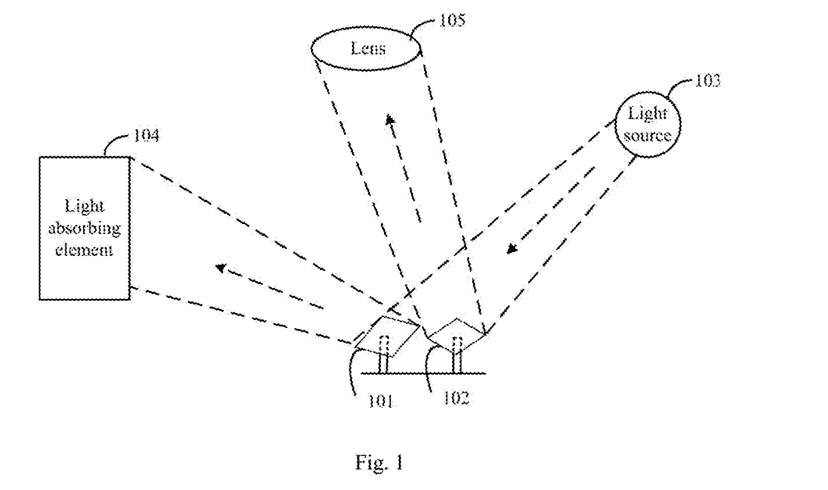
FIG. 1 is a schematic diagram of offset micro-mirrors and projection on the DMD of the optical valve in the related technologies.

FIG. 1 illustrates a schematic diagram of transmitted light rays corresponding two deflected micro-mirrors on the DMD of the optical valve in the related technologies. As illustrated in FIG. 1, the micro-mirror 101 and the micro-mirror 102 are deflected at different angles, where the micro-mirror 101 deflected at the angle reflects light emitted by a light source 103 onto a light absorbing element 104, so that the light absorbing element 104 absorbs the received light; and the micro-mirror 102 deflected at the angle reflects the light emitted by the light source 103 onto a lens 105 where the light exits, thus resulting in a pixel in the projected image.

As a hardware device, the resolution of the DMD in the optical valve is restricted by the process of fabricating the hardware device, so the demand for displaying a high-resolution image generally fails to be satisfied. For example, the resolution of the DMD in the existing optical device in use is 1920*1080, whereas the resolution of the image to be displayed in reality is typically 3840*2160, and apparently the resolution of the image to be displayed in reality is higher than the resolution supported by the DMD.

If the resolution of the optical valve is improved simply by modifying the process of fabricating the hardware device, then it will take a long period of time, and as there is a higher and higher quality of the projected image to be required by a user, it is highly desirable to propose a projection and display solution without losing any original pixel information in the high-resolution image using the existing optical device with the resolution supported by itself.

In order to overcome the drawback of losing some pixel information while projecting and displaying the high-resolution image, the embodiments of this disclosure provide a technical solution to processing a projected image, where a high-resolution image is segmented into N frames of images, the resolution of which is lower than or equal to the resolution of an optical valve, where the total amount of information in the N frames of images is the same as the amount of information in the image to be projected, so that the amount of information in the image will substantially not be lost, thus overcoming the drawback in the related technologies of losing some pixel information while projecting and displaying the high-resolution image, but instead maintaining the amount of pixel information carried in the high-resolution image while projecting and displaying the high-resolution image.

The embodiments of this disclosure will be described below in details with reference to the drawings.

Figure 2:
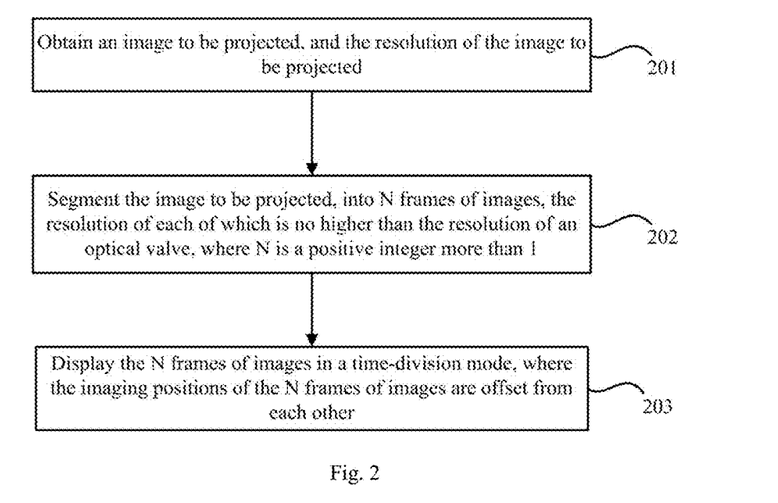
FIG. 2 is a schematic flow chart of a method for processing a projected image according to some embodiments of this disclosure.

FIG. 2 illustrates a schematic flow chart of a method for processing a projected image according to some embodiments of this disclosure, where the flow can be performed in software or in a combination of software and hardware, and the flow includes the following operations:

The operation 201 is to obtain an image to be projected, and the resolution of the image to be projected.

In some embodiments, the image to be projected can be an image obtained by an image signal processing system decoding a received video signal, and the resolution of the image can be obtained by the image signal processing system in a corresponding image software algorithm.

The operation 202 is to segment the image to be projected, into N frames of images, the resolution of each of which is no higher than the resolution of an optical valve, where N is a positive integer more than 1.

It shall be noted that if the image is projected and display using the DLP projector to which the DMD is applied, then the resolution of the optical valve refers to the resolution of the DMD in the optical valve, and if the image is projected and display using the Liquid Crystal on Silicon (LCOS) projector, then the resolution of the optical valve refers to the resolution of an imaging panel in the optical valve.

Since the image to be projected is segmented into the N frames of images, the amount of information in the image to be projected is more than the amount of information in each of the N frames of images, and the sum of the amounts of information in the respective ones of the N frames of images is equivalent to the amount of information in the image to be projected.

In some embodiments, the operation 202 can be performed in an implementation by dividing the image to be projected, into pixel blocks, each of the pixel blocks includes N pixels, and selecting pixels at the same positions in the respective pixel blocks as one of the N frames of images, where the same one of the N frames of images includes the pixels at the same positions in the different pixel blocks. Furthermore the pixel at the same position in each pixel block can be selected by selecting for each pixel block the first to N-th pixels in the same order, and obtaining the pixels at the corresponding coordinate positions in the first to N-th frames.

In some embodiments, every two of the N pixels in each pixel block are adjacent to each other.

By way of an example, each pixel block includes J adjacent pixels in the row direction, and K adjacent pixels in the column direction, where J is a positive integer more than 1 and less than N, K is a positive integer more than 1 and less than N, and the product of J and K is N; and the value of J is determined according to the number of pixels in the row direction of the image to be projected, and the number of pixels in the row direction of the optical valve, and the value of K is determined according to the number of pixels in the column direction of the image to be projected, and the number of pixels in the column direction of the optical valve.

In some embodiments, the resolution of the optical valve can be written in advance into a file stored in the system, and the image signal processing system can retrieve the resolution of the optical valve, and then divide the number of pixels in the image to be projected, in the row direction by the number of pixels in the optical valve in the row direction to determine J, and divide the number of pixels in the column direction of the image to be projected by the number of pixels in the column direction of the optical valve to determine K. In some cases, if the result of dividing the number of pixels in the image to be projected, in the row direction by the number of pixels in the optical valve in the row direction is not an integer, then the number of columns in the image to be projected will be reduced so that the result of dividing the number of pixels in the image to be projected, in the row direction by the number of pixels in the optical valve in the row direction is an integer; or in some cases, if the result of dividing the number of pixels in the image to be projected, in the column direction by the number of pixels in the optical valve in the column direction is not an integer, then the number of rows in the image to be projected will be reduced so that the result of dividing the number of pixels in the image to be projected, in the column direction by the number of pixels in the optical valve in the column direction is an integer.

In some embodiments, the image to be projected is segmented into the N frames of images by dividing the image to be projected, into pixel blocks, where each of the pixel blocks includes N pixels, and selecting pixels at the same positions in the different pixel blocks as one of the N frames of images, where for each pixel in each frame of image, the position of the pixel in the frame of image corresponds to the position of the pixel block corresponding to the pixel, in the image to be projected.

Figure 3:
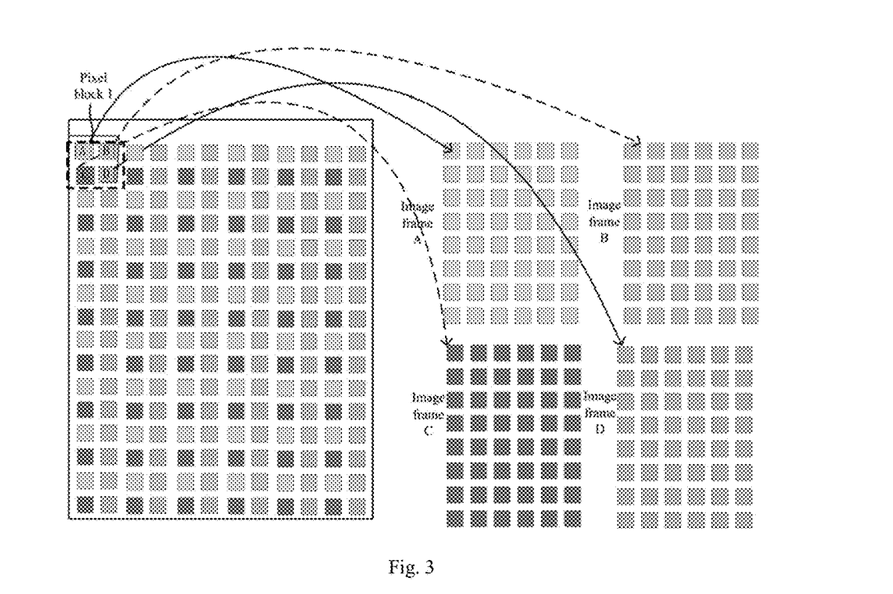
FIG. 3 is a schematic diagram of segmenting an image according to some embodiments of this disclosure.

For example, given N=4, in an implementation, as illustrated in FIG. 3, every 2*2 pixels (i.e., pixels in two rows and two columns) in the image to be projected can be selected as a pixel block, where the position of a pixel at the top-left corner in any one pixel block including 2*2 pixels is defined as the position A, the position of a pixel at the top-right corner in any one pixel block including 2*2 pixels is defined as the position B, the position of a pixel at the bottom-left corner in any one pixel block including 2*2 pixels is defined as the position C, and the position of a pixel at the bottom-right corner in any one pixel block including 2*2 pixels is defined as the position D. The pixels at the same positions in the respective pixel blocks are selected as one of the N frames of images, where for a pixel block 1, a pixel at the position A in the pixel block 1 is selected as a pixel at the coordinates (0, 0) in a first one of the frames of images into which the image to be projected is segmented; a pixel at the position B in the pixel block 1 is selected as a pixel at the coordinates (0, 0) in a second one of the frames of images into which the image to be projected is segmented; a pixel at the position C in the pixel block 1 is selected as a pixel at the coordinates (0, 0) in a third one of the frames of images into which the image to be projected is segmented; and a pixel at the position D in the pixel block 1 is selected as a pixel at the coordinates (0, 0) in a fourth one of the frames of images into which the image to be projected is segmented; and so on, where for each pixel block, the first pixel to the fourth pixel can be selected in the same order as the pixels at the corresponding coordinate positions in the first to fourth frames of images; and as can be apparent, respective pixels in a first frame of image (referred to as an image frame A) are pixels at the position A in the respective pixel blocks, respective pixels in a second frame of image (referred to as an image frame B) are pixels at the position B in the respective pixel blocks, respective pixels in a third frame of image (referred to as an image frame C) are pixels at the position C in the respective pixel blocks, and respective pixels in a fourth frame of image (referred to as an image frame D) are pixels at the position D in the respective pixel blocks, so that the image to be projected is segmented into four frames of image. In FIG. 3, for each pixel in each frame of image, the position of the pixel in the frame of image corresponds to the position of the pixel block corresponding to the pixel, in the image to be projected, where given the image frame A, for example, the pixel in the first row and the first column in the image frame A (i.e., the pixel at the position A in the pixel block 1) is positioned at the top-left corner in the image frame A (at the position coordinates (0, 0)), and also the pixel block 1 corresponding to the pixel in the first row and the first column is positioned at the top-left corner in the image to be displayed (at the position coordinates (0, 0)).

Figure 4:
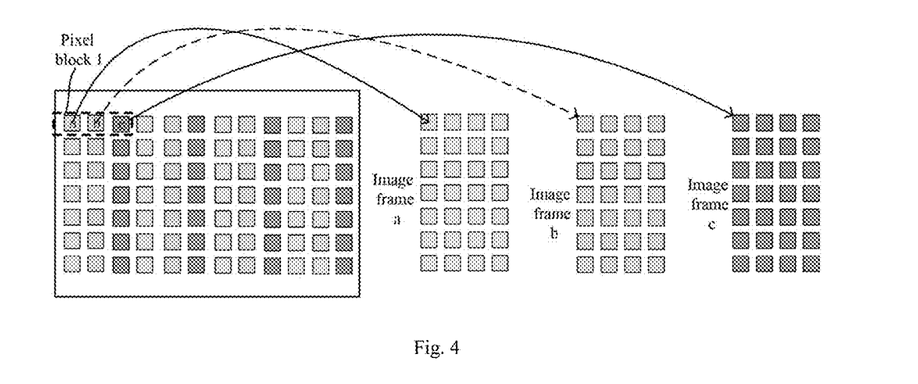
FIG. 4 is another schematic diagram of segmenting an image according to some embodiments of this disclosure.

In another example, given N=3, for example, in an implementation, as illustrated in FIG. 4, every 1*3 pixels in the image to be projected (i.e., pixels in one row and three columns) are selected as a pixel block, where the position of a left pixel in any one pixel block including 1*3 pixels is defined as the position a, the position of a middle pixel in any one pixel block including 1*3 pixels is defined as the position b, and the position of a right pixel in any one pixel block including 1*3 pixels is defined as the position c. Pixels at the same positions in the respective pixel blocks are selected as one of the N frames of images, where for a pixel block 1, a pixel at the position a in the pixel block 1 is selected as a pixel at the coordinates (0, 0) in a first one of the frames of images into which the image to be projected is segmented; a pixel at the position b in the pixel block 1 is selected as a pixel at the coordinates (0, 0) in a second one of the frames of images into which the image to be projected is segmented; and a pixel at the position c in the pixel block 1 is selected as a pixel at the coordinates (0, 0) in a third one of the frames of images into which the image to be projected is segmented; and so on, where for each pixel block, the first pixel to the third pixel can be selected in the same order as the pixels at the corresponding coordinate positions in the first to third frames; and as can be apparent, respective pixels in a first frame of image (referred to as an image frame a) are pixels at the position a in the respective pixel blocks, respective pixels in a second frame of image (referred to as an image frame b) are pixels at the position b in the respective pixel blocks, and respective pixels in a third frame of image (referred to as an image frame c) are pixels at the position c in the respective pixel blocks, so that the image to be projected is segmented into three frames of image. It shall be noted that in this implementation, every 1*3 pixels in the image to be projected (i.e., pixels in one row and three columns) are selected as a pixel block, but of course, alternatively every 3*1 pixels in the image to be projected (i.e., pixels in three rows and one column) can be selected as a pixel block, although a repeated description thereof will be omitted here.

Since the imaging positions of the N frames of images are offset from each other, that is, the imaging positions of the N frames of images are offset in the up-down direction and/or the left-right direction, and also typically 720P, 1080P, and other resolutions complying the video display standards are applicable to the DMD, so if the image to be projected is segmented into N frames of images in some embodiments, then N will preferably be an odd number more than 2 or be a square of an even number more than 1 (e.g., 4, 6, 8, 9, 25, etc.), that is, the image to be projected will be divided into a plurality of pixel blocks, where each of the pixel blocks includes N pixels, and the number of pixels N in each of the pixel blocks is preferably an odd number more than 2 or a square of an even number more than 1.

It shall be appreciated that the image to be projected can be segmented into the image frames due to the effect of persistence of vision for human eyes to thereby achieve a better display effect and save processing resources of the system, but this disclosure will not be limited thereto, for example, the value of J can be 1, or the value of K can be 1.

The operation 203 is to display the N frames of images in a time-division mode, where the imaging positions of the N frames of images are offset from each other.

In some embodiments, the imaging positions of the N frames of images are offset from each other, that is, the imaging positions of the N frames of images are offset in the up-down direction and/or the left-right direction. In some embodiments, the offset between the imaging positions of every two of the N frames of images, in the up-down direction or the left-right direction, is no more than the width of a single pixel. For example, the image frame A and the image frame C are offset in the up-down direction so that some pixels at the same positions in the image frame A and the image frame C do not coincide with each other; and the image frame C and the image frame D are offset in the left-right direction so that some pixels at the same positions in the image frame C and the image frame D do not coincide with each other.

After the image to be projected is segmented into a plurality of frames of images with a lower resolution than the resolution of the optical valve in the operation 202, the N frames of images can be projected in a time-division mode using the optical valve.

In some embodiments, offset angles required for a beam angle varying device to image the N frames of images are determined according to the division pattern of the pixel blocks, and the relative positions of the pixels in the pixel blocks; and the N frames of images are displayed in the time-division mode by adjusting the offset angles of the beam angle varying device sequentially according to the determined offset angles required for the beam angle varying device, and an output timing of the image frames, so that the N frames of images being projected and displayed are displaced and superimposed onto each other, that is, the offset angles of the beam angle varying device are adjusted so that the imaging positions of the N frames of images are offset from each other as needed, thus resulting in the whole image.

In some embodiments, the offset angles required for the beam angle varying device to image the N frames of images can be determined by determining a mapping relationship between the relative position of a pixel in a pixel block, and an offset angle required for the beam angle varying device according to the division pattern of the pixel blocks, and determining for any one of the pixel blocks the offset angles required for the beam angle varying device sequentially according to the relative position of each pixel in the pixel block, and the mapping relationship, where for any one pixel block, the relative position of each pixel in the pixel block corresponds to an offset angle required for the beam angle varying device. In a design phase, the image to be projected are divided in advance into pixel blocks, and pixels at the same positions in the respective pixel blocks are defined as one of the N frames of images, that is, for any pixel block, N pixels in the pixel block are positioned respectively in the different frames of images, and furthermore N offset angles required for the beam angle varying device can be determined according to the relative positions of the N pixels respectively in the pixel block, and the predetermined mapping relationship, and the N frames of images can be projected and displayed sequentially by adjusting the offset angles of the beam angle varying devices sequentially according to the predetermined N offset angels required for the beam angle varying device so that the N frames of images are imaged respectively at the different positions, and in this way, the N frames of images being projected and displayed are offset and superimposed onto each other.

In some embodiments, if the image to be projected is segmented differently, then for any one of the pixel blocks into which the image to be projected is divided, there will be a different mapping relationship between the relative position of a pixel in the pixel block, and an offset angle required for the beam angle varying device, and after the mapping relationship is determined, if different image frame signals are output sequentially, then different control instructions will be output sequentially as well to control the offset angles of the beam angle varying device to be adapted to the output image frame signals.

In an implementation, the N frames of images are displayed in the time-division mode by outputting the N frames of images sequentially to the optical valve at a preset interval of time, and adjusting for each frame of image the offset angle of the beam angle varying device, where the offset angles of the beam angle varying device are adjusted differently for the different image frames so that the N frames of images being projected and displayed are offset and superimposed onto each other, thus resulting in the whole image.

Figure 5:
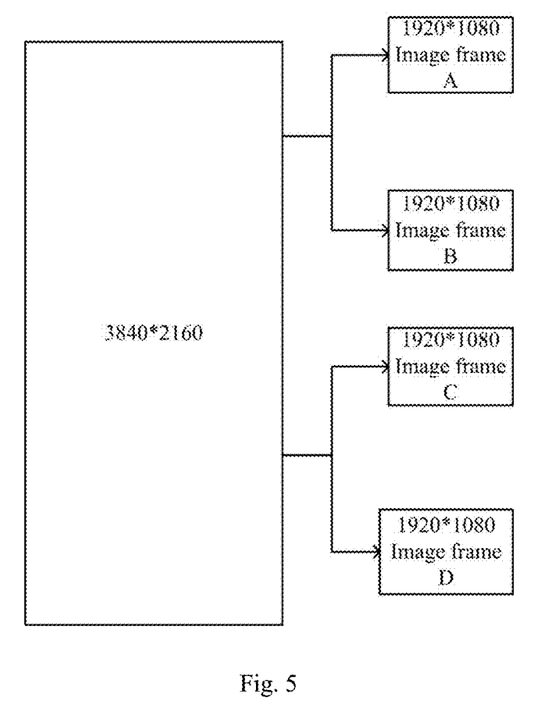
FIG. 5 is a schematic diagram of segmenting the image in FIG. 3 into a first frame of image, a second frame of image, a third frame of image, and a fourth frame of image according to some embodiments of this disclosure.

After the N frames of images are projected in the time-division mode in the operation 203, the light signals corresponding to the respective frames of images arrive at the lens sequentially, and the N frames of images are visually integrated due to the effect of persistence of vision for human eyes; and each frame of image can carry such an amount of information that is one N-th of the amount of information in the original image to be projected, so that the original image to be projected can be projected and displayed without losing any amount of pixel information in the image to be projected. For example, if the resolution of the image to be projected is 3840*2160, that is, the image to be projected includes 3840*2160 pixels of information, and the resolution supported by the optical valve is 1920*1080, then with the technical solution according to the embodiments of this disclosure, the image to be projected is segmented into four images, each of which with the resolution of 1920*1080, and as illustrated in FIG. 5, the four images respectively with the resolution of 1920*1080 include the same amount of information as in the image to be projected, so the pixel information in the image to be projected will not be lost at all.

As described above, the DLP projector in the related technologies of projections and displays generally includes the DMD chip which is a core element to project and display an image, and since the DMD chip is both an optic-mechanical device and an electronic-mechanical device, a drive signal output by a drive chip can be electrically controlled to drive the DMD chip to project the image.

By way of an example in which the DMD chip is an optical valve, typically there are P drive chips in the DMD chip, where P is a positive integer. A drive capacity of each drive chip can be set and adjusted without exceeding a drive capacity upper limit of the drive chip. Hereupon in some embodiments of this disclosure, the N frames of images obtained in the operation 202 can be output sequentially to the optical valve at the preset interval of time while being displaced and superimposed onto each other, so that the frames of images are projected and displayed, where the N frames of images can be output to the optical valve for projection and display, by splitting each frame of image to be projected and displayed, into P images according to the drive capacities of the drive chips in the DMD chip, and transmitting the P images respectively to the P drive chips in the DMD chip, so that the P drive chips output corresponding drive signals according to their respective received image information to drive the DMD chip to project and display the P images. The preset interval of time can alternatively be represented as such a refresh frequency of the optical valve that can be determined due to the effect of persistence of vision for human eyes to range from 60 Hz to 120 Hz.

In some embodiments, the N frames of images can be displayed in the time-division mode in such an order that is set so that an appropriate extent of visible comfort is attainable due to the effect of persistence of vision for human eyes.

Furthermore in view of a corresponding offset between the imaging positions of the N frames of images into which the image to be projected is segmented, in some embodiments of the disclosure, in order to project and display the N frames of images in the time-division mode without blurring the projected image on the screen, the offset angle of the beam angle varying device can be adjusted for each frame of image according to the predetermined mapping relationship between the relative position of a pixel in a pixel block, and an offset angle required for the beam angle varying device so that the N frames of images being projected and displayed can be displaced and superimposed onto each other without blurring the projected image on the screen. In some embodiments, the N frames of images can be projected in the time-division mode by predetermining the offset angle required for the beam angle varying device to image each frame of image, where the offset angle required for the beam angle varying device to image the each frame of image can be determined according to the division pattern of the pixel blocks, and the relative position of a pixel in a pixel block; and the N frames of images can be displayed in the time-division mode by adjusting the offset angle of the beam angle varying device sequentially according to the predetermined offset angle required for the beam angle varying device to image each frame of image, and the imaging position of each frame of image can be varied according to the offset angle of the beam angle varying device, so that there is some offset between the imaging positions of the N frames of images. Furthermore in some embodiments of this disclosure, the projection angle of the corresponding frame of image can be adjusted according to the division pattern of the pixel blocks, and the relative position of a pixel in a pixel block by controlling the beam angle varying device arranged between the optical valve and the lens to be offset respectively at the varying offset angle. In some embodiments, the beam angle varying device can be adjusted sequentially to the varying offset angle at a preset interval of time before or at the same time as each frame of image is output sequentially to the optical valve for projection, so that the projection angle at which each frame of image is projected by the optical valve is adjusted by the beam angle varying device, and then the frame of image is output to the lens for imaging as a result of projection onto a projection medium, thus resulting in the projected image.

Here the beam angle varying device can alternatively be an imaging shifting device, which can be a vibrating lens device, for example, the beam angle varying device can be a transmission lens, where the direction of a projected light beam of the optical valve varies with a varying offset angle of the transmission lens; or the beam angle varying device can be a reflecting lens, where also the reflection angle of a reflected light ray varies with a varying offset angle of the reflecting lens. The initial position of the beam angle varying device can be set to a position corresponding to the projection angle of the first image frame, that is, the first offset angle is 0 degree, and furthermore a second offset angle can be determined according to the offset relationship between the positions of the first image frame and the second image frame, and so on, thus simplifying a process of controlling the beam angle varying device.

Figure 6:
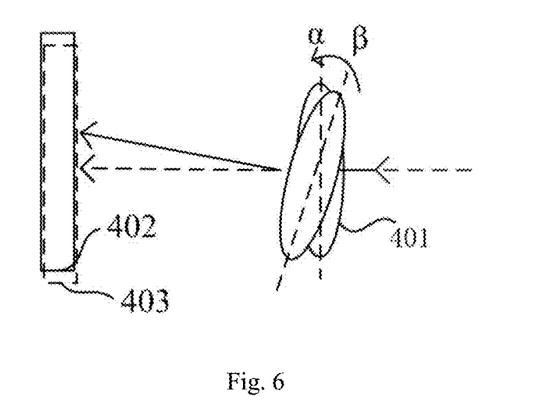
FIG. 6 is a schematic diagram of adjusting an image frame A and an image frame C using a beam angle varying device according to some embodiments of this disclosure.
Figure 7:
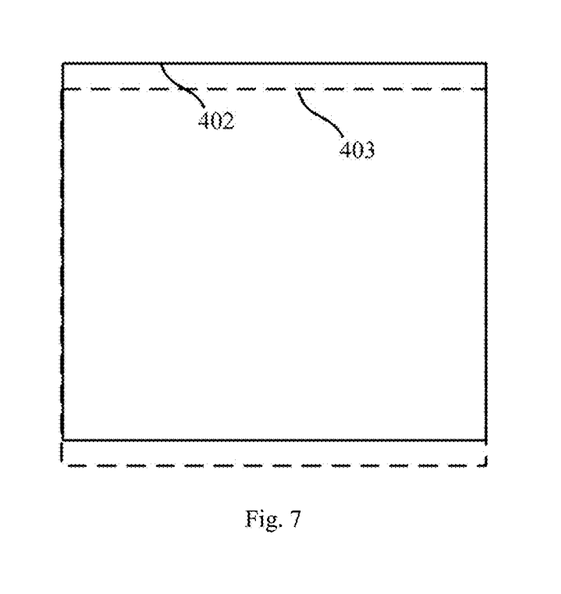
FIG. 7 is a schematic diagram of two frames of images from a light path in FIG. 6 according to some embodiments of this disclosure.

For example, FIG. 6 illustrates a schematic diagram of light paths over which the image frame A and the image frame C are projected, where a vibrating lens 401 which is the beam angle varying device creates the light paths over which these two image frames are projected. In some embodiments, the beam angle varying device can be a vibrating lens, and the image frames illustrated in FIG. 6 are offset upward and downward. It shall be noted that the image frames illustrated in FIG. 6 are offset upward and downward in the side view, where the image frames being offset upward and downward refer to the image frames being offset while referring to the user watching the projection. Correspondingly FIG. 7 illustrates a schematic diagram of projected images on the projection medium after these two frames of images obtained over the light paths illustrated in FIG. 6 are imaged by the lens, where the vibrating lens 401 at the first offset angle α (α=0 degree at the initial position) creates the light path over which the image frame A is projected, and the light signal corresponding to the image frame A passes the vibrating lens 401 at the first offset angle α, and then arrives at the lens, thus resulting in the projection image 402 as a result of imaging; and the vibrating lens 401 at the second offset angle β creates the light path over which the image frame C is projected, and the light signal corresponding to the image frame C passes the vibrating lens 401 at the second offset angle β, and then arrives at the lens, thus resulting in the projection image 403 as a result of imaging, so that there is a corresponding displacement relationship between the image frame A and the image frame C being imaged (for example, the image frame C is displaced downward relative to the image frame A by one third row of pixels), and furthermore the projection image 402 and the projection image 403 corresponding respectively to the image frame A and the image frame C will be integrated due to the effect of persistence of vision for human eyes, and displayed as the original image to be projected without blurring the image on the screen.

Figure 8:
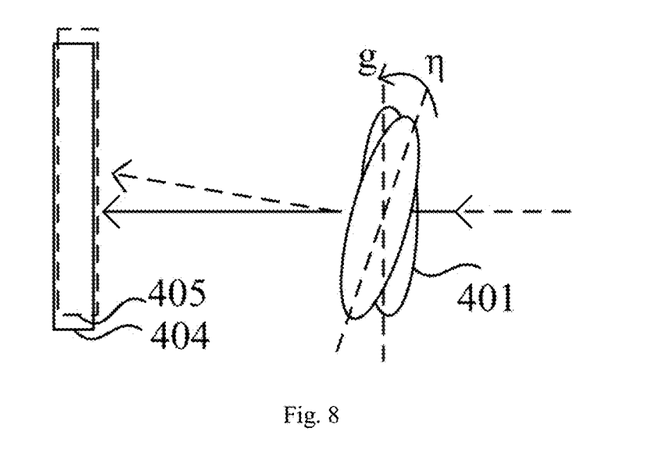
FIG. 8 is a schematic diagram of adjusting an image frame C and an image frame D using the beam angle varying device according to some embodiments of this disclosure.
Figure 9:
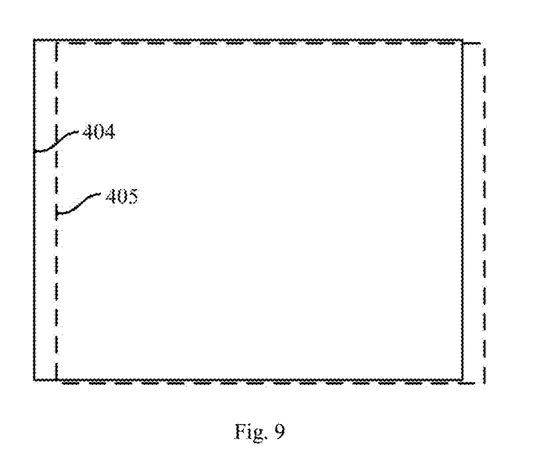
FIG. 9 is a schematic diagram of two frames of images from a light path in FIG. 8 according to some embodiments of this disclosure.

FIG. 8 illustrates a schematic diagram of light paths over which the image frames C and D are projected, where the vibrating lens 401 creates the light paths over which these two image frames are projected, by changing the direction of light, and the image frames illustrated in FIG. 8 are offset leftward and rightward (in the top view). Correspondingly FIG. 9 illustrates a schematic diagram of projected images on the projection medium after these two frames of images obtained over the light paths illustrated in FIG. 8 are imaged by the lens, where the vibrating lens 401 at the third offset angle γ creates the light path over which the image frame C is projected, and the light signal corresponding to the image frame C passes the vibrating lens 401 at the third offset angle γ, and then arrives at the lens, thus resulting in the projection image 404 as a result of imaging; and the vibrating lens 401 at the fourth offset angle η creates the light path over which the image frame D is projected, and the light signal corresponding to the image frame D passes the vibrating lens 401 at the fourth offset angle θ, and then arrives at the lens, thus resulting in the projection image 405 as a result of imaging, so that there is a corresponding displacement relationship between the image frame C and the image frame D being imaged, and furthermore the projection image 404 and the projection image 405 corresponding respectively to the image frame C and the image frame D will be integrated due to the effect of persistence of vision for human eyes, and displayed as the original image to be projected without blurring the image on the screen.

It shall be noted that neither the original optical elements nor the original architecture of the created light paths in the existing projection display device and system will be modified in the technical solution according to some embodiments of this disclosure. For example, given the DLP projector including the DMD chip, the light source outputs the three primary colors in sequence according to the information about the colors to be displayed in the pixels in the N frames of images, and the DMD reflects the light beams of the light source to render the information carried in the pixels in the image frames to be displayed, as done for displaying the image using the DMD in the existing DLP projector.

In view of such a drawback in the related technologies of projections that some of the original amount of pixel information in the image to be projected is lost if the resolution of the image is higher than the resolution of the optical valve, the embodiments of this disclosure are applicable to such a situation that the resolution of the image to be projected is higher than the resolution of the optical valve to thereby achieve a better technical effect that can be attained in the embodiments of this disclosure. In some embodiments of this disclosure, the resolution of the image to be projected is higher than the resolution of the optical valve, and the resolution of each of the N frames of images into which the image to be projected is segmented is lower than or equal to the resolution of the image to be projected; and of course, if the resolution of each of the N frames of images is closer to the resolution of the image to be projected, then the image will be projected and displayed more clearly.

As can be apparent from the description above, in the method for processing a projected image according to the embodiments of the disclosure, after the image to be projected is obtained, the image to be projected is segmented into the N frames of images with the resolution lower than or equal to that of the optical valve, and furthermore the N frames of the image are displaced and projected in the time-division mode. As can be apparent, if there is a high resolution of the image to be projected, then in the technical solution according to the embodiments of this disclosure, the high-resolution image will be segmented into N frames of image with the resolution lower than or equal to the resolution of the optical valve, where the total amount of information in the N frames of images is the same as the amount of information in the image to be projected, and then the N frames of images will be displayed in the time-division mode. Since the total amount of information in the N frames of images is the same as the amount of information in the image to be projected, substantially no amount of information in the image will be lost, so the drawback in the related technologies of losing some pixel information in the high-resolution image can be overcome, and the amount of pixel information carried in the high-resolution image can be maintained while projecting and displaying the high-resolution image.

In order to better understand the above embodiments of this disclosure, this disclosure will be described below in an application scenario by way of an example.

In the existing laser projection display system, the resolution of the DMD is 1920*1080, and the resolution of the image to be projected and displayed is 3840*2160, where the image to be projected carries 8M pixel information; and a process of projecting and displaying the image according to the embodiments above of this disclosure in this scenario will be described as follows.

The operation 201 is to obtain the resolution of an image to be projected, where the resolution is 3840*2160.

The operation 202 is to segment the image to be projected, into N frames of images, the resolution of each of the N frames of images is no higher than the resolution of an optical valve, where the amount of information in the image to be projected is more than the amount of information in each of the N frames of images, and N is a positive integer more than 1. The image to be projected can be segmented as in the operation 202 illustrated in FIG. 2, and in the schematic diagrams as illustrated in FIG. 3 and FIG. 4, so a detailed description thereof will be omitted here.

Figure 10:
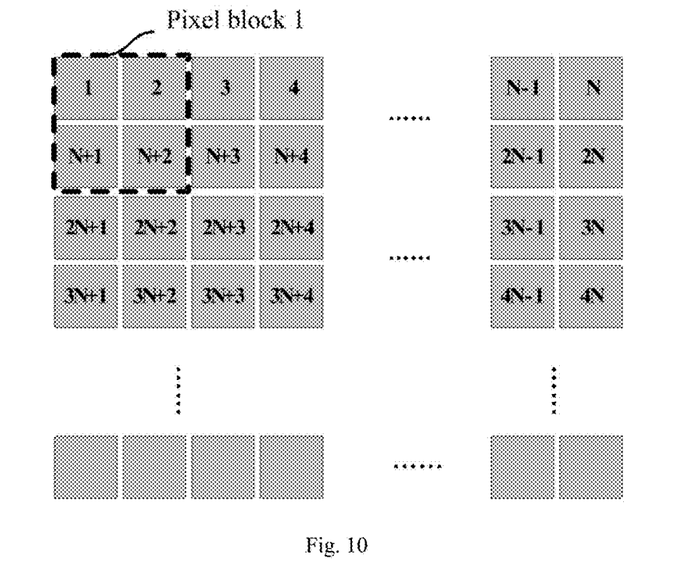
FIG. 10 is a simplified schematic diagram of segmenting an image according to some embodiments of this disclosure.
Figure 11:
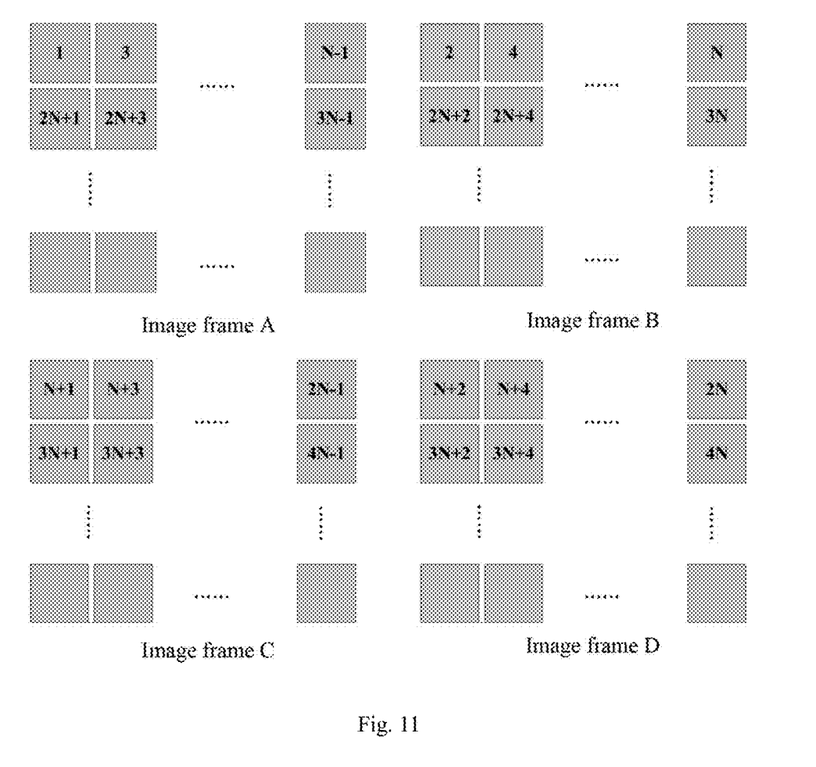
FIG. 11 is a schematic diagram of segmenting the image in FIG. 10 into an image frame A, an image frame B, an image frame C, and an image frame D according to some embodiments of this disclosure.

In this operation, the image to be projected can alternatively be segmented into N frames of image as in the schematic diagram illustrated in FIG. 10. For example, given N=4, as illustrated in FIG. 10, every 2*2 pixels in the image to be projected (i.e., pixels in two rows and two columns) can be selected as a pixel block, and as illustrated in FIG. 10, the position of a pixel at the top-left corner in any one pixel block including 2*2 pixels can be defined as the position 1, the position of a pixel at the top-right corner in any one pixel block including 2*2 pixels can be defined as the position 2, the position of a pixel at the bottom-left corner in any one pixel block including 2*2 pixels can be defined as the position N+1, and the position of a pixel at the bottom-right corner in any one pixel block including 2*2 pixels can be defined as the position N+2. Correspondingly the pixel block 2 is selected in the same pattern as the pixel block 1, but the pixels at the respective positions in the pixel block 2 are represented differently from the pixel block 1, for example, a pixel positioned at the top-left corner in the pixel block 2 is represented as 3, a pixel positioned at the top-right corner in the pixel block 2 is represented as 4, a pixel positioned at the bottom-left corner in the pixel block 2 is represented as N+3, and a pixel positioned at the bottom-right corner in the pixel block 2 is represented as N+4; and the respective pixel blocks can be selected as such. The pixels at the same positions in the respective pixel blocks are selected as one of the N frames of images, that is, for the pixel block 1, the pixel at the position 1 in the pixel block 1 is selected as a pixel at the coordinates (0, 0) in the image frame A into which the image to be projected is segmented; the pixel at the position 2 in the pixel block 1 is selected as a pixel at the coordinates (0, 0) in the image frame B into which the image to be projected is segmented; the pixel at the position N+1 in the pixel block 1 is selected as a pixel at the coordinates (0, 0) in the image frame C into which the image to be projected is segmented; and the pixel at the position N+2 in the pixel block 1 is selected as a pixel at the coordinates (0, 0) in the image frame D into which the image to be projected is segmented; and so on. For each pixel block, the first to N-th pixels can be selected in the same order as the pixels at the corresponding coordinate positions in the first to N-th frames, thus resulting in the image frame A, the image frame B, the image frame C, and the image frame D into which the image to be projected is segmented, as illustrated in FIG. 11.

The operation 203 is to display the image frame A and the image frame B in a time-division mode using a DMD. In this process, an offset angle of a beam angle varying device can be set to thereby offset the image frame A and the image frame B upward and downward, and to offset the image frame B and the image frame D leftward and rightward.

Figure 12:
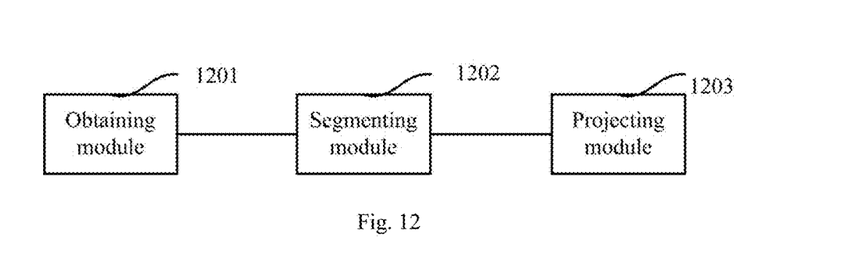
FIG. 12 is a schematic structural diagram of a device for processing a projected image according to some embodiments of this disclosure.

Based upon the same technical idea, some embodiments of this disclosure further provides an apparatus for processing a projected image, where the apparatus can perform a related image software algorithm as a result of software programming, or process a projected image as a result of software programming together with hardware, and the apparatus can perform the embodiments of the method above for processing a projected image. FIG. 12 illustrates a schematic structural diagram of an apparatus for processing a projected image according to some embodiments of this disclosure.

As illustrated in FIG. 12, an apparatus for processing a projected image according to some embodiments of this disclosure includes:

An obtaining module 1201 configured to obtain an image to be projected, and the resolution of the image to be projected;

A segmenting module 1202 configured to segment the image to be projected, into N frames of images, the resolution of each of the N frames of images is no higher than the resolution of an optical valve, where N is a positive integer more than 1; and A projecting module 1203 configured to display the N frames of images in a time-division mode, where the imaging positions of the N frames of images are offset from each other.

In some embodiments, the imaging positions of the N frames of images are offset from each other, that is, the imaging positions of the N frames of images are offset in the up-down direction and/or the left-right direction. In some embodiments, the offset between the imaging positions of every two of the N frames of images, in the up-down direction or the left-right direction, is no more than the width of a single pixel. For example, the image frame A and the image frame C are offset in the up-down direction so that some pixels at the same positions in the image frame A and the image frame C do not coincide with each other; and the image frame C and the image frame D are offset in the left-right direction so that some pixels at the same positions in the image frame C and the image frame D do not coincide with each other.

In some embodiments, the segmenting module 1202 is configured:

To divide the image to be projected, into pixel blocks, where each of pixel blocks includes N pixels; and To select pixels at the same positions in the respective pixel blocks as one of the N frames of images.

In some embodiments, every two of the N pixels in each pixel block are adjacent to each other.

In some embodiments, each pixel block includes J adjacent pixels in the row direction, and K adjacent pixels in the column direction, where J is a positive integer more than 1 and less than N, K is a positive integer more than 1 and less than N, and the product of J and K is N.

In some embodiments, the value of J is determined according to the number of pixels in the row direction of the image to be projected, and the number of pixels in the row direction of the optical valve, and the value of K is determined according to the number of pixels in the column direction of the image to be projected, and the number of pixels in the column direction of the optical valve.

In some embodiments, a projection path of the image to be projected passes a beam angle varying device configured to adjust imaging positions of the N frames of images; and The projecting module 1203 is configured:

To determine offset angles required for the beam angle varying device to image the N frames of images, according to the division pattern of the pixel blocks, and the relative positions of the pixels in the pixel blocks; and To display the N frames of images in the time-division mode by adjusting the offset angles of the beam angle varying device sequentially according to the determined offset angles required for the beam angle varying device.

In some embodiments, the projecting module 1203 configured to determine the offset angles required for the beam angle varying device to image the N frames of images, according to the division pattern of the pixel blocks, and the relative positions of the pixels in the pixel blocks is configured to determine a mapping relationship between the relative position of each pixel in any one pixel block, in the pixel block, and an offset angle required for the beam angle varying device according to the division pattern of the pixel blocks, and to determine for any pixel block an offset angle required for the beam angle varying device to image each frame of image, according to the relative position of each pixel in the pixel block, in the pixel block, and the mapping relationship.

In some embodiments, the resolution of the image to be projected is higher than the resolution of the optical valve, and the resolution of each of the N frames of images is lower than or equal to the resolution of the optical valve.

Figure 13:
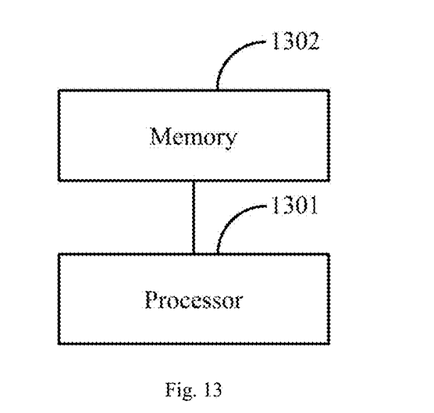
FIG. 13 is a schematic structural diagram of another device for processing a projected image according to some embodiments of this disclosure.

As illustrated in FIG. 13, another apparatus for processing a projected image according to some embodiments of this disclosure includes:

At least one processor 1301; and

A memory 1302 communicatively connected with the at least one processor 1301, where:

The memory 1302 stores instructions executable by the at least one processor 1301, where the instructions are executed by the at least one processor 1301 to cause the at least one processor 1301:

To obtain an image to be projected, and the resolution of the image to be projected;

To segment the image to be projected, into N frames of images, the resolution of each of which is no higher than the resolution of a optical valve, where N is a positive integer more than 1; and To display the N frames of images in a time-division mode, where the imaging positions of the N frames of images are offset from each other.

In some embodiments, the imaging positions of the N frames of images are offset from each other, that is, the imaging positions of the N frames of images are offset in the up-down direction and/or the left-right direction. In some embodiments, the offset between the imaging positions of every two of the N frames of images, in the up-down direction or the left-right direction, is no more than the width of a single pixel. For example, the image frame A and the image frame C are offset in the up-down direction so that some pixels at the same positions in the image frame A and the image frame C do not coincide with each other; and the image frame C and the image frame D are offset in the left-right direction so that some pixels at the same positions in the image frame C and the image frame D do not coincide with each other.

In some embodiments, the instructions are executed by the at least one processor 1301 to further cause the at least one processor 1301:

To divide the image to be projected, into pixel blocks, where each of the pixel blocks includes N pixels; and To select pixels at the same positions in the respective pixel blocks as one of the N frames of images.

In some embodiments, every two of the N pixels in each pixel block are adjacent to each other.

In some embodiments, each pixel block includes J adjacent pixels in the row direction, and K adjacent pixels in the column direction, where J is a positive integer more than 1 and less than N, K is a positive integer more than 1 and less than N, and the product of J and K is N.

In some embodiments, the value of J is determined according to the number of pixels in the row direction of the image to be projected, and the number of pixels in the row direction of the optical valve, and the value of K is determined according to the number of pixels in the column direction of the image to be projected, and the number of pixels in the column direction of the optical valve.

In some embodiments, a projection path of the image to be projected passes a beam angle varying device configured to adjust imaging positions of the N frames of images; and The instructions are executed by the at least one processor 1301 to further cause the at least one processor 1301:

To determine offset angles required for the beam angle varying device to image the N frames of images, according to the division pattern of the pixel blocks, and the relative positions of the pixels in the pixel blocks; and To display the N frames of images in the time-division mode by adjusting the offset angles of the beam angle varying device sequentially according to the determined offset angles required for the beam angle varying device.

In some embodiments, the resolution of the image to be projected is higher than the resolution of the optical valve.

Figure 14:
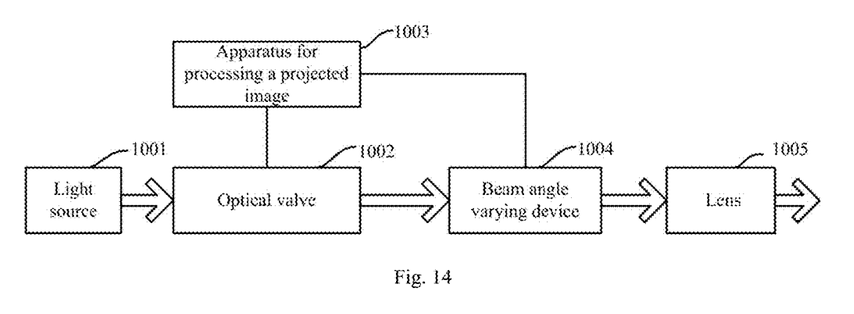
FIG. 14 is a schematic structural diagram of a projection display system according to some embodiments of this disclosure.

Based upon the same technical idea, some embodiments of this disclosure further provides a projection display system, which can perform the flow of the method for processing a projected image according to the embodiments described above, and which can project and display an image in the flow of the method for processing a projected image according to the embodiments described above. FIG.

14 illustrates a schematic structural diagram of a projection display system according to some embodiments of this disclosure.

As illustrated in FIG. 14, the projection display system according to the embodiments of this disclosure includes a light source 1001, an optical valve 1002, an apparatus 1003 for processing a projected image, a beam angle varying device 1004, and a lens 1005, where the beam angle varying device 1004 can be arranged between the optical valve 1002 and the lens 1005, and the apparatus 1003 for processing a projected image can be as described in the embodiments described above.

The beam angle varying device 1004 is configured to be controlled by the apparatus 1003 for processing a projected image, to be offset. The light source 1001 is configured to illuminate the optical valve 1002, so that the optical valve 1002 projects image frames, which are output by the beam angle varying device to the lens 1005 for imaging, and projected onto a projection medium, thus resulting in the projected image, where light beams can be transmitted over light paths as represented by the arrows in FIG. 6 and FIG. 8.

It shall be appreciated that the projection display system according to some embodiments of this disclosure can be embodied based upon the existing projection display device or system, and FIG. 6 and FIG. 8 merely illustrate the projection display systems according to some embodiments of this disclosure, where the other optical elements and the optical architecture for assisting in light path creation, and projection and display can be as described for the existing projection display device and system, so a detailed description thereof will be omitted here. For example, the optical valve 1002 can be embodied as the optical valve in the existing projection display system, e.g., the DMD chip in the DLP projector; and the lens 1005, the light source 1001, and the other optical elements and the optical architecture for creating the light paths over which the image is projected and displayed can be as described for the existing projection display device and system.

In some embodiments, the optical valve 1002 can be a DMD chip including P drive chips, where P is a positive integer. A drive capacity of each drive chip can be set and adjusted without exceeding a drive capacity upper limit of the drive chip.

Furthermore if the optical valve is the DMD chip, in some embodiments of this disclosure, the apparatus 1003 for processing a projected image can output the N frames of images obtained in the operation 202 sequentially to the optical valve 1002 at a preset interval of time while displacing and superimposing them onto each other, where the respective frames of images can be output to the optical valve for projection and display, by splitting each frame of image to be projected and displayed, into P components according to the drive capacities of the drive chips in the DMD chip, and transmitting the P components respectively to the P drive chips in the DMD chip, so that the P drive chips output corresponding drive signals according to their respective received image information to drive the DMD chip to project and display the P components.

Furthermore the apparatus 1003 for processing a projected image can be further configured to determine an offset angle required for the beam angle varying device 1004 to image each frame of image, and to control the beam angle varying device 1004 to be deflected, according to the offset angle required for the beam angle varying device 1004 to image each frame of image, to thereby adjust the projection angle of each frame of image.

In an implementation in software, these solutions can be embodied in modules performing the functions described here (e.g., programs, functions, etc.), where software codes can be stored in a memory unit, and executed by a processor. The memory unit can be embodied internal or external to the processor.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although some embodiments of the disclosure have been described, those skilled in the art benefiting from the underlying inventive concept can make additional modifications and variations to these embodiments. Therefore the appended claims are intended to be construed as encompassing those embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus for processing a projected image, the apparatus comprising:
   at least one processor; and
   a memory communicatively connected with the at least one processor, the memory storing instructions executable by the at least one processor, the instructions executed by the at least one processor to cause the at least one processor to:

obtain an image to be projected, and a resolution of the image to be projected;

divide the image to be projected into multiple pixel blocks, each pixel block comprising N pixels;

generate N frames of images, each of the N frames of images including only one of the N pixels from each of the multiple pixel blocks at a same respective position in each pixel block, a resolution of each of the N frames of images no higher than a resolution of an optical valve, wherein N is a positive integer greater than 1, and a projection path of the image to be projected passes a beam angle varying device configured to adjust imaging positions of the N frames of images;

determine offset angles for the beam angle varying device to image the N frames of images according to a division pattern of the pixel blocks and relative positions of the pixels in the pixel blocks; and display the N frames of images in a time-division mode by adjusting offset angles of the beam angle varying device sequentially according to the determined offset angles for the beam angle varying device, wherein the imaging positions of the N frames of images are offset from each other.

2. The apparatus according to claim 1, wherein each pixel block comprises J adjacent pixels in a row direction, and K adjacent pixels in a column direction, wherein J is a positive integer more than 1 and less than N, K is a positive integer more than 1 and less than N, and a product of J and K is N.

3. The apparatus according to claim 2, wherein a value of J is determined according to the number of pixels in a row direction of the image to be projected, and the number of pixels in a row direction of the optical valve, and a value of K is determined according to the number of pixels in a column direction of the image to be projected, and the number of pixels in a column direction of the optical valve.

4. The apparatus according to claim 1, wherein the resolution of the image to be projected is higher than the resolution of the optical valve.

5. A projection display system, comprising:
a light source;
an optical valve;
an apparatus for processing a projected image;
a beam angle varying device; and
a lens, wherein:
the beam angle varying device is arranged between the optical valve and the lens, and is configured to adjust imaging positions of N frames of images;
the light source is configured to illuminate the optical valve, so that the optical valve projects the image frames, which are output by the beam angle varying device to the lens for imaging, and projected onto a projection medium, thus resulting in the projected image; and
the apparatus for processing a projected image comprises:
at least one processor; and
a memory communicatively connected with the at least one processor, the memory storing instructions executable by the at least one processor, the instructions executed by the at least one processor to cause the at least one processor to:
obtain an image to be projected, and a resolution of the image to be projected;
divide the image to be projected into multiple pixel blocks, each pixel block comprising N pixels;
generate N frames of images, each of the N frames of images including only one of the N pixels from each of the multiple pixel blocks at a same respective position in each pixel block, a resolution of each of the N frames of images no higher than a resolution of the optical valve, wherein N is a positive integer greater than 1; and
display the N frames of images in a time-division mode, wherein imaging positions of the N frames of images are offset from each other.

6. The system according to claim 5, wherein each pixel block comprises J adjacent pixels in a row direction, and K adjacent pixels in a column direction, wherein J is a positive integer more than 1 and less than N, K is a positive integer more than 1 and less than N, and a product of J and K is N.

7. The system according to claim 6, wherein a value of J is determined according to the number of pixels in a row direction of the image to be projected, and the number of pixels in the row direction of the optical valve, and a value of K is determined according to the number of pixels in a column direction of the image to be projected, and the number of pixels in a column direction of the optical valve.

8. The system according to claim 5, wherein a projection path of the image to be projected passes a beam angle varying device configured to adjust imaging positions of the N frames of images; and
the instructions are executed by the at least one processor to further cause the at least one processor:
to determine offset angles required for the beam angle varying device to image the N frames of images, according to a division pattern of the pixel blocks, and relative positions of the pixels in the pixel blocks; and
to display the N frames of images in the time-division mode by adjusting the offset angles of the beam angle varying device sequentially according to the determined offset angles required for the beam angle varying device.

9. The system according to claim 5, wherein the resolution of the image to be projected is higher than the resolution of the optical valve.

10. A method for processing a projected image, the method comprising:
obtaining an image to be projected, and a resolution of the image to be projected;
dividing the image to be projected into multiple pixel blocks, each pixel block comprising N pixels;
generating N frames of images, each of the N frames of images including only one of the N pixels from each of the multiple pixel blocks at a same respective position in each pixel block, a resolution of each of the N frames of images no higher than resolution of an optical valve, wherein N is a positive integer greater than 1, and a projection path of the image to be projected passes a beam angle varying device configured to adjust imaging positions of the N frames of images;
determining offset angles for the beam angle varying device to image the N frames of images according to a division pattern of the pixel blocks and relative positions of the pixels in the pixel blocks; and
displaying the N frames of images in a time-division mode by adjusting offset angles of the beam angle varying device sequentially according to the determined offset angles for the beam angle varying device, wherein the imaging positions of the N frames of images are offset from each other.

11. The method according to claim 10, wherein each pixel block comprises J adjacent pixels in a row direction, and K adjacent pixels in a column direction, wherein both J and K are positive integers more than 1 and less than N, and a product of J and K is N.

12. The method according to claim 11, wherein a value of J is determined according to the number of pixels in a row direction of the image to be projected, and the number of pixels in a row direction of the optical valve, and a value of K is determined according to the number of pixels in a column direction of the image to be projected, and the number of pixels in a column direction of the optical valve.

13. The method according to claim 10, wherein the resolution of the image to be projected is higher than the resolution of the optical valve.

14. The apparatus according to claim 1, wherein imaging positions of pixels at the same positions in two adjacent frames of images overlap one other.

15. The system according to claim 5, wherein imaging positions of pixels at the same positions in two adjacent frames of images overlap one other.

16. The method according to claim 10, wherein imaging positions of pixels at the same positions in two adjacent frames of images overlap one other.

* * * * *